Aug. 20, 1957   E. R. AMBROSE ET AL   2,803,295
STARTING AID FOR INTERNAL COMBUSTION ENGINES
Filed June 28, 1954   2 Sheets-Sheet 1

Edwin R. Ambrose
John W. Ambrose
INVENTORS
BY
Attorneys

Aug. 20, 1957  E. R. AMBROSE ET AL  2,803,295
STARTING AID FOR INTERNAL COMBUSTION ENGINES
Filed June 28, 1954  2 Sheets-Sheet 2

Edwin R. Ambrose
John W. Ambrose
INVENTORS

BY *[signatures]*
Attorneys

United States Patent Office 2,803,295
Patented Aug. 20, 1957

2,803,295
STARTING AID FOR INTERNAL COMBUSTION ENGINES

Edwin R. Ambrose, Whitehorse, Yukon Territory, and John W. Ambrose, Kingston, Ontario, Canada Application June 28, 1954, Serial No. 439,728

2 Claims. (Cl. 158—36)

This invention relates to a starting aid for internal combustion engines and more specifically provides a device for forcing a heated fuel and air mixture into the intake manifold of an engine to aid in starting at extremely low temperatures.

An object of this invention is to provide a starting aid for internal combustion engines having a partial combustion or preheating cell for heating a fuel and air mixture which is forced into the intake manifold of an internal combustion engine prior to the starting of the engine.

Another object of this invention is to provide a starting aid for an internal combustion engine which is automatically rendered inoperative upon starting of the engine and corresponding vacuum created in the intake manifold.

A further object of this invention is to provide a starting aid for an internal combustion engine utilizing novel and improved structure and structural relationships wherein a fuel and air mixture is delivered to a partial combustion cell for preheating prior to admission into the intake manifold of an internal combustion engine.

A still further object of this invention is to provide a starting aid for internal combustion engines which enables instant starting at extremely low temperatures, which is simple in construction, readily adaptable to all types of engines, readily serviceable and replaceable, non-detrimental to the engine and which requires a minimum of adjustments and no special type fuels.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
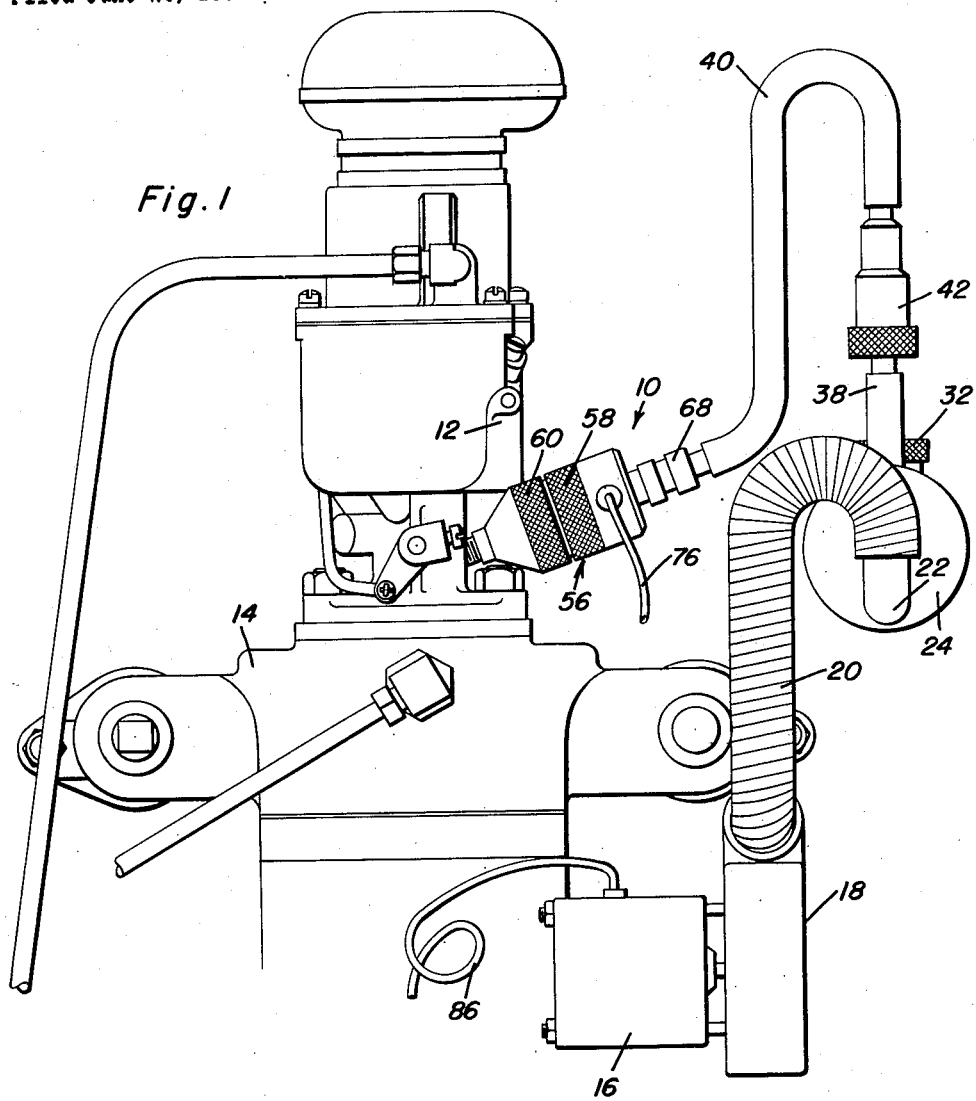
Figure 1 is an end elevation view showing the starting aid of this invention attached to a conventional internal combustion engine.

Referring now specifically to Figure 1 of the drawings, it will be seen that the numeral 10 generally designates the starting aid for internal combustion engines for attachment to a carburetor 12 positioned on the usual intake manifold 14. The carburetor 12 and manifold 14 are constructed in the usual manner, and the starting aid 10 is in communication with the interior of the carburetor adjacent the intake manifold 14 by any suitable means, such as a threaded aperture or the like. It will be seen that this threaded aperture or other communication means is positioned adjacent the intake manifold 14 and adjacent the main carburetor jets (not shown in detail).

The starting aid 10 of this invention includes an electric motor 16 for driving a suitable centrifugal type blower 18 having a flexible discharge conduit 20 for attachment to an inlet pipe 22 which is attached to the bottom of a tank 24. The tank 24 is provided with an elongated pipe 26 secured to and in communication with the inlet pipe 22 and the elongated pipe 26 is provided with a plurality of longitudinally spaced apertures 28 for a purpose described hereinafter. The tank 24 is provided with a filler opening 30 having a closure cap 32 thereon with an inwardly extending peripheral flange 34 projecting inwardly from the inlet opening 30. Fuel 36 is placed in the tank 24 through the inlet opening 30 and the cap 32 is secured thereon by screw threaded interengaging means and the fuel 36 should be filled to the bottom of the flange 34, thereby assuring an air space between the upper level of the fuel 36 and the top of the tank 24. Adjacent the center of the top of the tank 24 is a discharge conduit 38 which is secured to a flexible conduit 40 and a valve member 42 is disposed between the conduit 38 and the flexible conduit 40. The valve 42 includes a housing having a valve seat 44, a spider-like support 46 for slidably receiving the shank 48 of a valve 50. A coil spring 52 is disposed between the valve face 50 and the spider-like support 46 for urging the valve face away from the valve seat 44 to its normal position. It will be seen that the valve stem 48 includes a headed portion 54 for retaining the valve stem 48 on the spider support 46. The valve face 50 is positioned towards the tank 24 wherein the valve 50 will close when a vacuum is created in the flexible conduit 40.

Disposed between the flexible conduit 40 and the carburetor 12 is a partial combustion or preheating cell, generally indicated by the numeral 56, which includes a housing member 58 having a detachable end portion 60 which has an externally threaded nipple 62 extending therefrom for positioning in a threaded aperture in the carburetor 12. The body 58 is provided with an internally threaded aperture 64 for receiving an externally threaded connecting member 66 which, in turn, is connected to the conduit 40 by a suitable fitting 68. The interior of the body 58 is provided with a base member 70 having a plurality of apertures 72 for permitting the passage of a fuel and air mixture through the base 70. A pair of metallic studs 74 is positioned in the base 70, and one of the studs 74 is connected to an electric conduit 76 and the other of the studs 74 is grounded to the body 58 by a spring contact member 78. The studs 74 are connected by a heating coil 80 which is disposed on the interior of the body 58. A porous pad of material 82 containing an exothermic substance is positioned adjacent the electric heating coil 80 and is held in assembled relation by a screen member 84 which has its peripheral edge between the body member 58 and the removable end 60, thereby positioning the pad 82 adjacent the electric heating coil 80.

Figure 5:
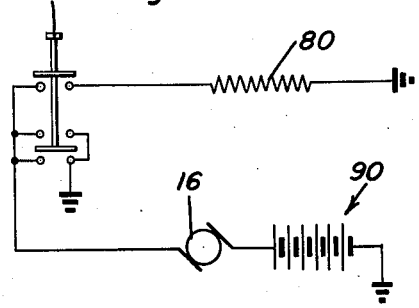
Figure 5 is a schematic diagram of the wiring system utilized in conjunction with the starting aid for internal combustion engines of this invention.
Figure 2:
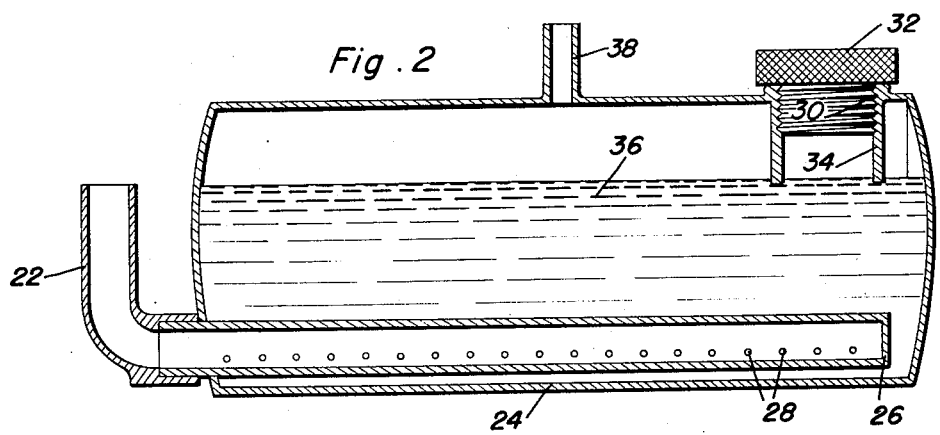
Figure 2 is a longitudinal, vertical section taken substantially along the center line of the fuel tank showing the arrangement of the air discharge and the mixture discharge.
Figure 3:
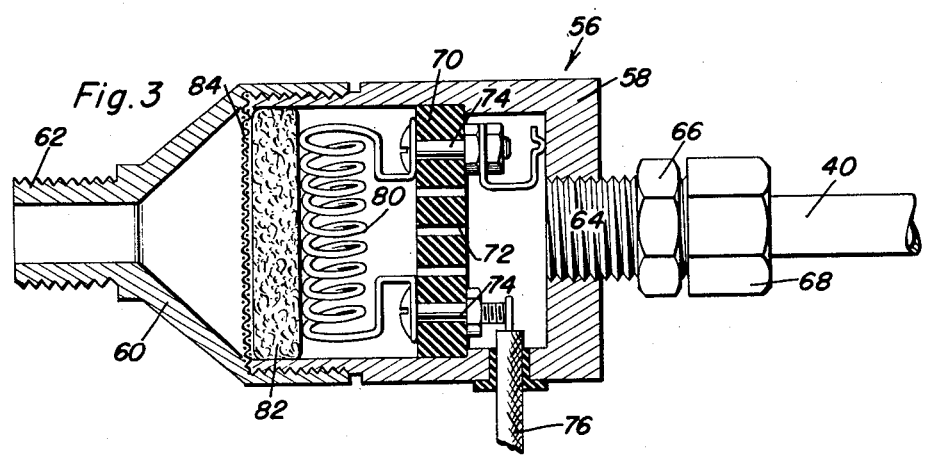
Figure 3 is a longitudinal, vertical section taken substantially along the center line of the partial combustion cell body of the starting aid.
Figure 4:
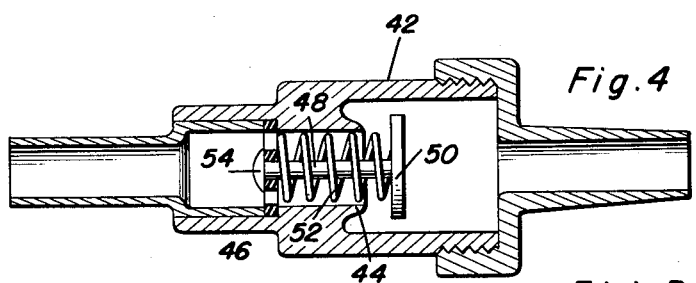
Figure 4 is a longitudinal, vertical section taken substantially along the center line of the automatically operated valve for rendering the starting aid inoperative when the engine starts.

It will be understood that a suitable electric conduit 86 is provided for driving the motor 16, and a switch member 88 is provided for connecting the motor 16 and the electric heating coil 80 to a suitable source of power, such as a battery 90 as shown in the schematic diagram in Figure 5. When the switch 88 is pushed inwardly, the battery is connected to the motor 16 and the heating element 80 for simultaneous operation, and when the switch is moved outwardly, the battery 90 is connected to the motor 16 and the heating coil 80 is de-energized.

The tank 24 should be mounted so that its longitudinal axis is parallel to the engine crankshaft if on a stationary type engine or the longitudinal axis should be parallel to the vehicle axis which has the least angular displacement in a mobile vehicle. The distance between the tank 24 and the partial combustion cell 56 as well as between the tank and the blower 18 should be as short as possible and with a minimum of restrictions, and the pipe 26 should be mounted in the tank 24 at its lowest position. In certain large engines, it may be desirable to mount more than one of the units per engine, depending on the area to be heated and the cubic capacity of the engine, or the like. The tank 24 should be filled no further than to the bottom of the inlet flange 34 with a well known hydrocarbon fuel, such as leaded gasolines, white gasoline, benzene, methyl alcohol, or the like. The partial combustion cell or pad 82 may utilize asbestos wool thoroughly impregnated with cerium oxalate, platinum oxide or palladium oxide. The passage of hydrocarbon fumes through pad 82 after it is heated causes partial combustion of the fumes in an exothermic reaction which maintains the cell at a temperature below the ignition point of the combustible mixture whereby the operation of the pad will be self-sustaining and an unignited and heated combustible mixture is discharged from the pad. This pad is produced from a most economical exothermic substance and each pad will cost only a few cents, thereby making the replacement of these pads of minor financial consideration.

The operation of the device will be readily understood. With the starting aid 10 of this invention attached to an engine 14 substantially as shown, the switch 88 is moved to a "start" position wherein the heating element 80 is connected to the electrical circuit and the blower 18 is actuated by the motor 16. The switch 88 is left in this position for approximately one minute, and then moved outwardly to a "run" position, wherein the heating element 80 is disconnected or de-energized and the motor 16 and the blower 18 continue operating. The heating element 80 heats the pad 82 and the air goes through the blower and pipe 26 and then out through apertures 28 up through the fuel 36 thereby forming a fuel and air mixture which proceeds through the valve 42 and through the apertures 72 and the exothermic pad 82. Due to the catalytic action, the fuel and air mixture is preheated and forced into the lower end of the carburetor and the intake manifold. After the initial heating by the heating coil 80, the cell 82 is self-sustaining, and has been successful in temperatures ranging down to —65° F. Naturally, the length of time that the starting aid is employed depends upon the atmospheric conditions and the type of engine on which the device is attached. The particular relationship of the various elements is determined by each individual set-up.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling with the scope of the appended claims.

What is claimed as new is as follows:

1. A partial combustion cell comprising a tubular body having an inlet for receiving a forced supply of combustible mixture from a charge forming device and an outlet remote from the inlet, a porous pad of an exothermic substance disposed in said body between the inlet and outlet, and means disposed in said body between the pad and inlet for initially heating the pad and the combustible mixture passing therethrough, the combustible mixture and heated exothermic substance forming an exothermic reaction for sustaining the temperature of the pad for raising the temperature of combustible mixture to a temperature below the ignition point, the reaction between the heated pad and the combustible mixture causing partial combustion of the mixture thereby providing an unignited and heated combustible mixture at the outlet.

2. The combination of claim 2 wherein said heating means includes an electric heating element energized by a manual switch means, and a retaining screen on the outlet side of the porous pad for holding the pad in assembled relation during passage of the combustible mixture therethrough.

References Cited in the file of this patent

UNITED STATES PATENTS

| 1,051,122 | Krayer | Jan. 21, 1913 |
| 1,334,446 | Good | Mar. 23, 1920 |
| 1,453,669 | Good | May 1, 1923 |
| 1,456,980 | Good | May 29, 1923 |
| 1,625,312 | Good | Apr. 19, 1927 |
| 1,625,313 | Good | Apr. 19, 1927 |
| 1,728,027 | Woolson | Sept. 10, 1929 |
| 2,671,438 | Alcock | Mar. 9, 1954 |

FOREIGN PATENTS

| 279,834 | Great Britain | Feb. 20, 1929 |
| 104,241 | Australia | June 16, 1937 |